United States Patent
Kim et al.

(10) Patent No.: US 7,113,774 B2
(45) Date of Patent: Sep. 26, 2006

(54) SYSTEM AND METHOD OF PROVIDING MOBILE PHONE BROADCASTING SERVICE UTILIZING CBS

(75) Inventors: Kyung-Sun Kim, Seongnam-Si (KR); Young-Hoon Kim, Gwangmyeong-Si (KR)

(73) Assignee: Omnitel Inc., Seoul (KR)

( * ) Notice: Subject to any disclaimer, the term of this patent is extended or adjusted under 35 U.S.C. 154(b) by 438 days.

(21) Appl. No.: 10/468,210

(22) PCT Filed: Nov. 16, 2001

(86) PCT No.: PCT/KR01/01955
§ 371 (c)(1),
(2), (4) Date: Aug. 18, 2003

(87) PCT Pub. No.: WO02/067620
PCT Pub. Date: Aug. 29, 2002

(65) Prior Publication Data
US 2004/0063400 A1   Apr. 1, 2004

(30) Foreign Application Priority Data
Feb. 17, 2001   (KR) .................................. 2001-7968

(51) Int. Cl.
*H04L 39/08*   (2006.01)
(52) U.S. Cl. .................... 455/414.4; 715/522; 455/466; 455/3.03
(58) Field of Classification Search ............ 455/414.4, 455/3.03, 432.2, 2.01, 3.04, 414.3, 432.3, 455/466; 715/513, 501.1, 531, 522; 709/203, 709/202, 206, 207, 219

See application file for complete search history.

(56) References Cited

U.S. PATENT DOCUMENTS 6,964,012 B1 * 11/2005 Zirngibl et al. ............. 715/513

* cited by examiner

*Primary Examiner*—Edward F. Urban
*Assistant Examiner*—Tu X. Nguyen
(74) *Attorney, Agent, or Firm*—GWiPS

(57) ABSTRACT

Disclosed is a method of providing a mobile phone broadcasting service using a cell broadcasting system (CBS) including (1) processing information in forms of voice, multimedia, text and image by an information providing system and transmitting the processed information to a mobile phone broadcasting system through an Internet network, (2) simultaneously transmitting the text and image information out of the information received from the mobile phone broadcasting system, a linked phone number connectable to an automatic response system (ARS) or a linked URI, connectable to a wireless Internet broadcasting server to a plurality of mobile phone terminals through a wireless network, and (3) when the linked phone number is selected in order to receive voice information out of the information individually received from the mobile phone terminals, the ARS providing the voice information to a mobile phone terminal for the selected phone number, or when the linked URI, is selected in order to receive multimedia information out of the information individually received from the mobile phone terminals, the wireless Internet broadcasting server providing the multimedia information to a mobile phone terminal for the selected URI.

4 Claims, 4 Drawing Sheets

SYSTEM AND METHOD OF PROVIDING MOBILE PHONE BROADCASTING SERVICE UTILIZING CBS

BACKGROUND OF THE INVENTION

1. Field of the Invention

The present invention relates to a system and method of providing a mobile phone broadcasting service utilizing a cell broadcasting system (CBS), and more particularly, to a system and method of providing a mobile phone broadcasting service using a CBS that can separately construct an information providing service and a mobile phone broadcasting service and can simultaneously transmit the same information to a plurality of mobile phone terminals using a CBS in real time.

2. Description of the Prior Art

In order to simulcast in real time, a point to point servicing method based on a short message service, that is, a polling method has been conventionally used. The servicing method has advantages in that information reaches the receiving end almost perfectly and one to one marketing is made with convenience and ease.

However, the conventional servicing method has several problems in simultaneously transmitting broadcasting information to multiple subscribers more than 0.5 million in real time. Also, the conventional servicing method, which is an individual transmission method, is costly for individuals to use information.

Therefore, as the number of mobile phone terminal subscribers has drastically increased, it is on the one hand critically important to use mass marketing tools for a large number of subscribers, and there is, on the other hand, great demand for servicing methods for simultaneously providing multiple users with an information providing service in real time.

SUMMARY OF THE INVENTION

To solve the above-described problems, it is an object of the present invention to provide a system and method of providing a mobile phone broadcasting service using a CBS that can separately construct an information providing service and a mobile phone broadcasting service and can simultaneously transmit the same information to a plurality of mobile phone terminals using a CBS in real time.

To accomplish the above objective of the present invention, a method of providing a mobile phone broadcasting service utilizing a cell broadcasting system (CBS) is comprising the steps of: processing information in forms of voice, multimedia, text and image by an information providing system; transmitting the processed information to a mobile phone broadcasting system through an Internet network; simultaneously transmitting the text and image information among the information received from the mobile phone broadcasting system to an individual phone number connected to an automatic response system (ARS); and when a phone number is selected to receive a voice information, the ARS provides and transmits the voice information to the selected phone number, or when the URL is selected to receive multimedia information at the individual phone number of the mobile phone terminals, the wireless Internet broadcasting server provides and transmits the multimedia information to a mobile phone terminal via the selected URL.

Accordingly, the voice or multimedia information are selectively and automatically received from the mobile tone broadcasting system upon the request by the individual phone number of the mobile phone terminals in real time by using the CBS.

According to another aspect of the present invention, there is provided a system of providing a mobile phone broadcasting service using a cell broadcasting system (CBS) including an information providing system for processing information in the forms of voice, multimedia, text and image data, a mobile phone broadcasting system for receiving the processed information from the information providing system via an Internet network, and a plurality of mobile phone terminals for simultaneously receiving the voice information, the multimedia information, and the text and image information from the mobile phone broadcasting system through a wireless network via a base station in real time and using the same.

DETAILED DESCRIPTION OF THE PREFERRED EMBODIMENT

Figure 1:
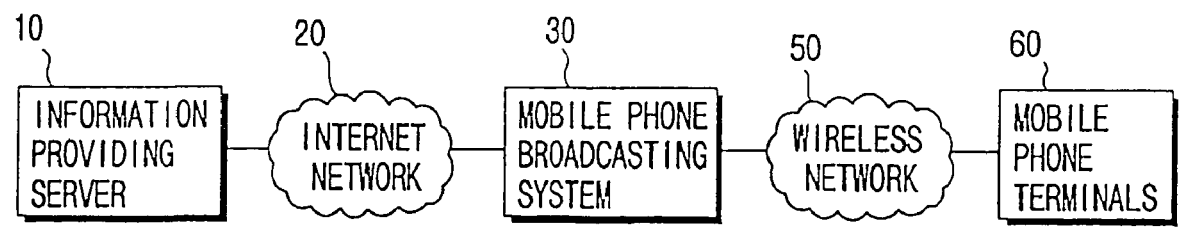
FIG. 1 is an overall schematic diagram of a mobile phone broadcasting service system according to the present invention.

Referring to FIG. 1, a mobile phone broadcasting service system according to the present invention includes an information providing system 10, a mobile phone broadcasting system 30, a plurality of mobile phone terminals 60, and a wireless network 50 having an Internet network 20 connecting these systems to one another and a separate base station.

Figure 2:
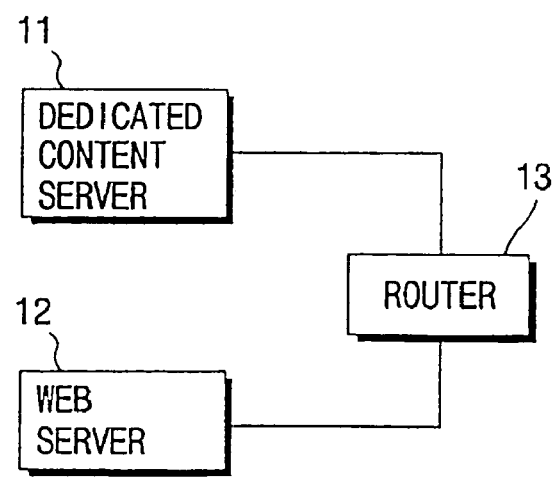
FIG. 2 is a partial block diagram of an information providing system shown in FIG. 1.

Referring to FIG. 2, the information providing system 10 includes a dedicated content server 11, a web server 12 and a router 13.

The dedicated content server 11 processes a variety of updated information into the forms of voice, multimedia, text and image data. In other words, the dedicated content server 11 processes various types of information in order to provide useful information in real time to the mobile phone terminals 60 used by mobile phone broadcasting information providing service subscribers.

The web server 12 constructs a web-based service environment in which the processed information is to be provided to the mobile phone broadcasting system 30 over the Internet network 20. The router 13 specifies the most efficient path for transmission of the processed information.

Figure 3:
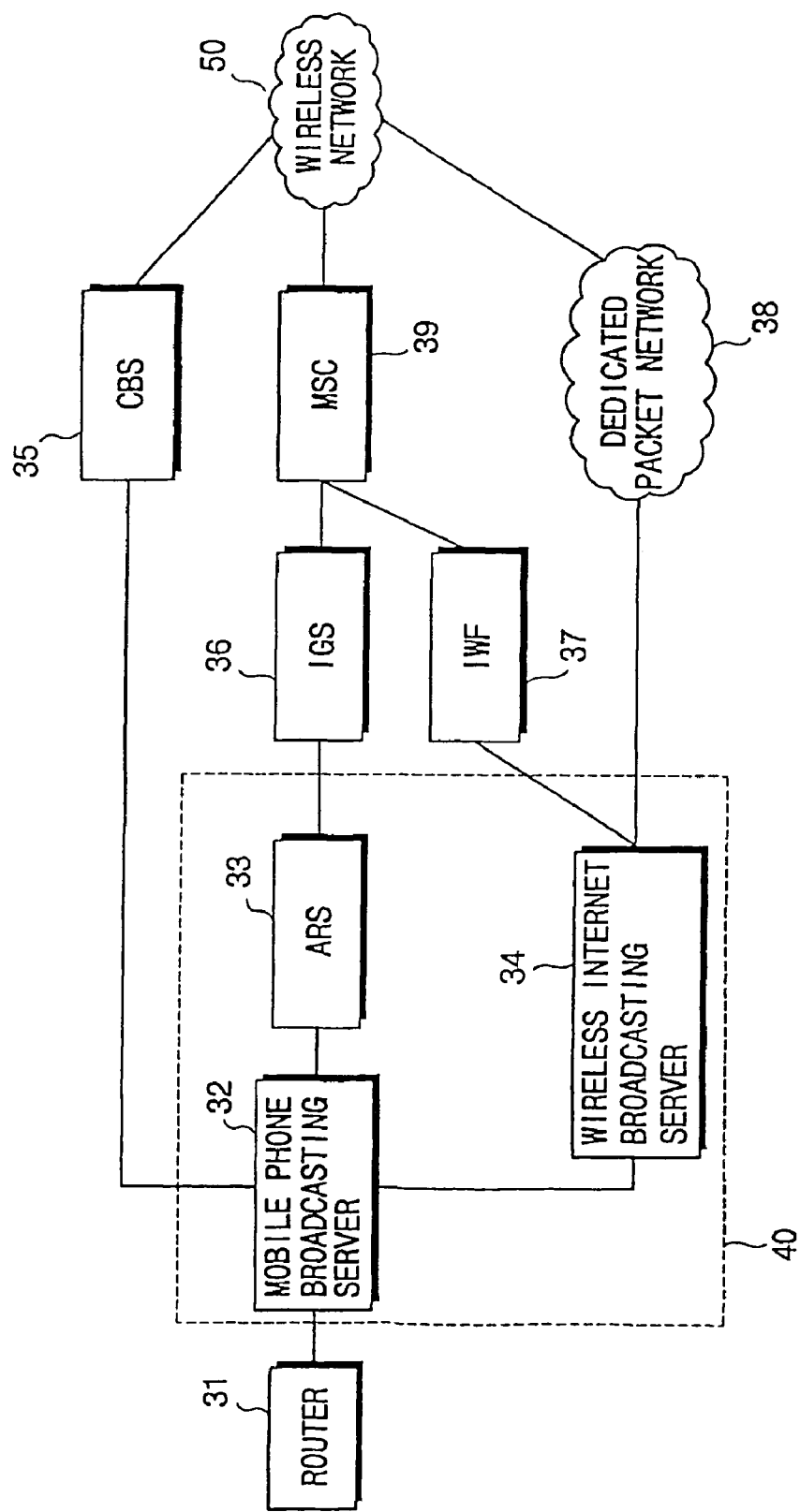
FIG. 3 is a detailed block diagram of a mobile phone broadcasting system shown in FIG. 1.

Referring to FIG. 3, the mobile phone broadcasting system 30 includes a router 31, a mobile phone broadcasting server 32, an automatic response system (ARS) 33, a wireless Internet broadcasting server 34, a cell broadcasting system (CBS) 35, an Inter-gateway system (IGS) 36, an Inter-working function server (IWF) 37, a dedicated packet network 38 and a mobile switching center (MSC) 39. Here, the mobile phone broadcasting server 32, the ARS 33 and the wireless Internet broadcasting server 34 are collectively referred to as a mobile phone broadcasting platform 40.

The router 31 specifies the most efficient path for receiving the information processed and transmitted from the information providing system 10.

The mobile phone broadcasting server 32 categorizes and separates the information received from the information providing system 10 via the router 31 as voice information, multimedia information, text information or image information.

The ARS 33 stores the voice information separated by the mobile phone broadcasting server 32 and automatically provides the voice information upon request by the mobile phone terminals 60.

The wireless Internet broadcasting server 34 stores the multimedia information separated by the mobile phone broadcasting server 32 and automatically provides the multimedia information upon request by the mobile phone terminals 60.

The CBS 35 receives and manages the text information and the image information separated by the mobile phone broadcasting server 32, transmits the information to the wireless network 50 upon request, and transmits the information to the mobile phone terminals 60 via the scoreless network 50 that has passed through the base station simultaneously in real time.

When voice information is separately requested by the mobile phone terminals 60, connection to the MSC 39 is made via the wireless network 50 and the ARS 33 is connected through the IGS 36, that is, a gateway for voice communication.

When voice information is separately requested by the mobile phone terminals 60, a connection to the MSC 39 is made via the wireless network 50 and the ARS 33 is connected through the IGS 36, that is, a gateway for voice communication.

When wireless Internet information is separately requested by the mobile phone terminals 60, a connection to the MSC 39 is made via the wireless network 50 and the wireless Internet broadcasting server 34 is connected through the IWF 37, that is, a gateway for data communication. Hero, in the case where the mobile phone terminals 60 support packet transmission of CDMA2000-IX network or the like, a direct connection to the wireless Internet broadcasting server 34 is made through the wireless network 50 and the dedicated packet network 38, without a separate gateway.

Figure 4:
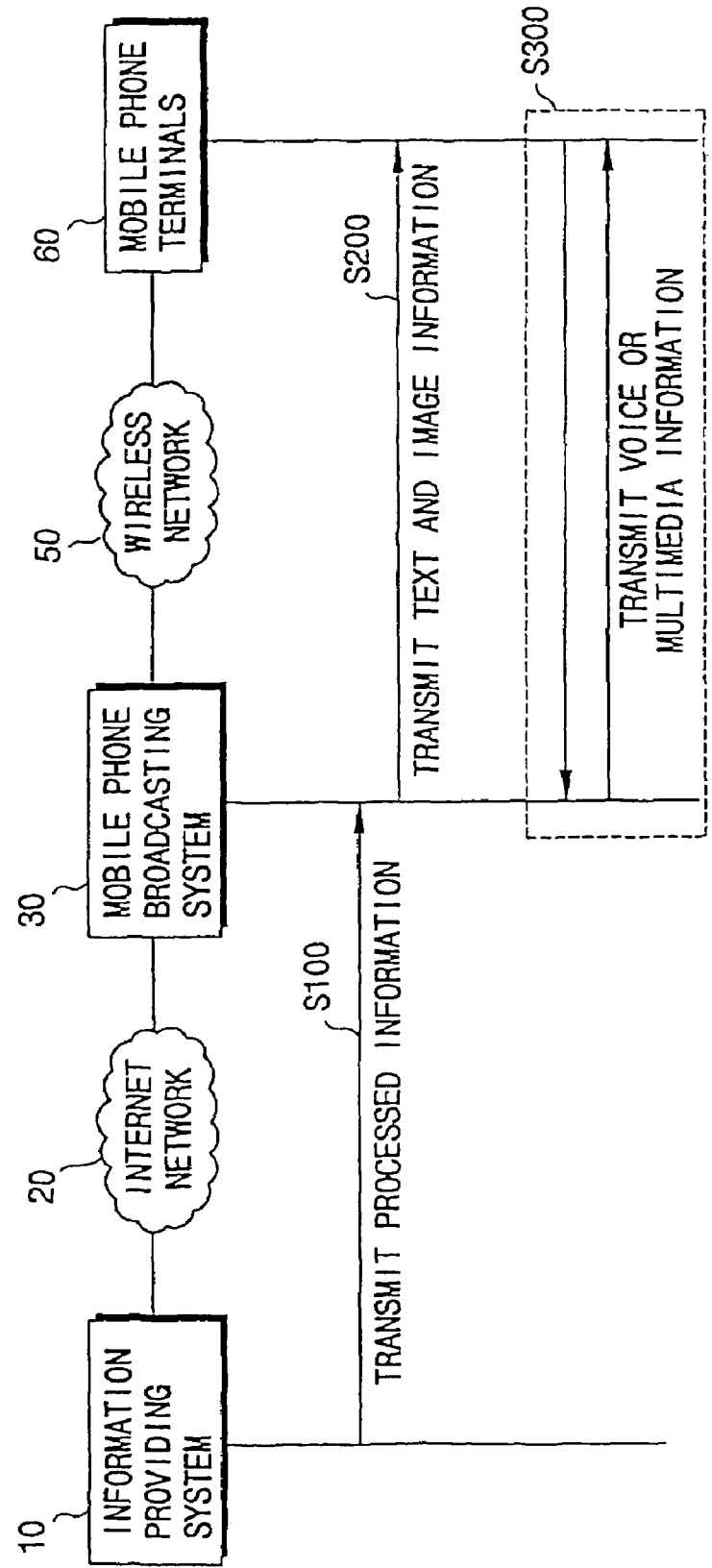
FIG. 4 is a flow diagram of a method of providing a mobile phone broadcasting service according to the present invention.

FIG. 4 is a flow diagram of a method of providing a mobile phone broadcasting service according to the present invention.

The mobile phone broadcasting service according to the present invention will now be described in detail with reference to FIG. 4. First, the information in the forms of voice, multimedia, text and image that has been processed by the information providing system 10 is transmitted to the mobile phone broadcasting system 30 through the Internet network 20 (First step: S 100).

Next the mobile phone broadcasting system 30 simultaneously transmits the text and image information among the received information, a linked phone number connected to the ARS 33 or a linked URL connected to the wireless Internet broadcasting server 34 to the plurality of mobile phone terminals 60 through the wireless network 50 (Second step: S200).

The mobile phone terminals 60 select, using the received information, the phone number linked to the ARS 33 if the voice information is desired, and the URL linked to the wireless Internet broadcasting server 34 if the multimedia information is desired. Then, the ARS 33 or the wireless Internet broadcasting server 34 is connected according to the selection of the linked phone number or URL to be provided with the voice or multimedia information (Third step: S300).

Figure 5:
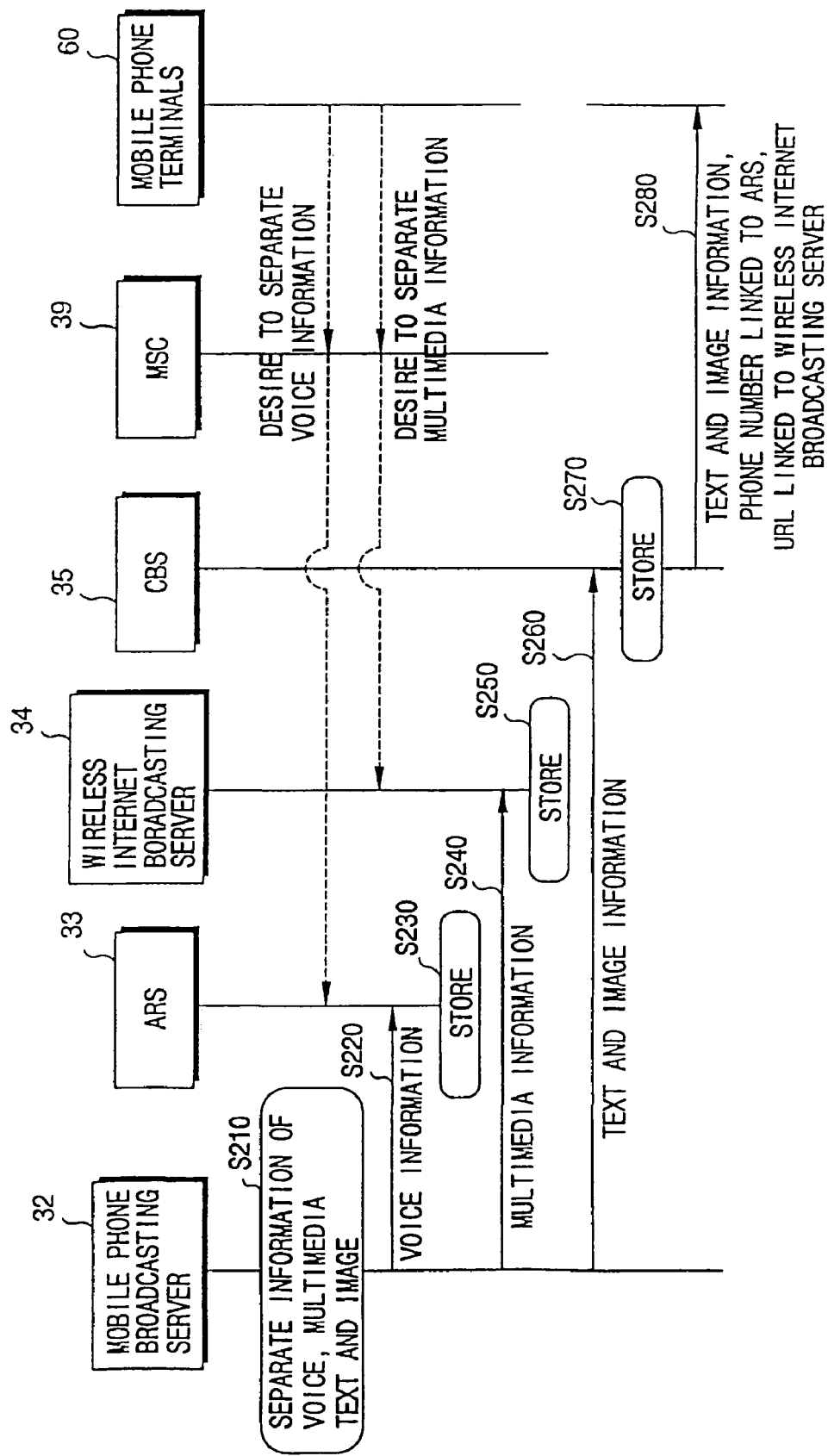
FIG. 5 is a flow diagram of a detailed embodiment of the second step shown in FIG. 4.

FIG. 5 is a flow diagram of a detailed embodiment of the second step shown in FIG. 4.

Referring to FIG. 5, the mobile phone broadcasting server 32 separates the information received from the information providing system 10 via the Internet network 20 into voice information, multimedia information, text information and image information (step S210).

Here, the separated voice information is transmitted to the ARS 33 and stored in a separate storage means (steps S220 and S230). The separated multimedia information is transmitted to the wireless Internet broadcasting server 34 and stored in a separate storage means (steps S240 and S250). Also, the separated text information and the separated image information are transmitted to the CBS 35 and stored in a separate storage means (steps S260 and S270).

Then, the text information and the image information stored in the storage means of the CBS 35, the phone number linked to the ARS 33 or the URL linked to the wireless Internet broadcasting server 34, are simultaneously transmitted in real time to the plurality of mobile phone terminals 60 through the wireless network 50 via the base station.

In an embodiment of the method of providing a mobile phone broadcasting service using the CBS, the text or image information may be transmitted to a predetermined subscriber of the mobile phone terminal according to the operator's selection, and charges for communication or use of information may be separately billed whenever the voice or multimedia information is used.

According to the present invention, useful information can be simultaneously transmitted to a plurality of mobile phone terminals in real time and an information service may be provided by means of a base station. Also, mass marketing tools can be advantageously utilized.

What is claimed is:

1. A system of providing a mobile phone broadcasting service utilizing a cell broadcasting system (CBS) comprising:
    an information providing system (10) for processing information in forms of voice, multimedia, text and image,
    an Internet network (20) for controlling the information providing system (10),
    a mobile phone broadcasting system (30) for receiving the processed information from the information providing system (10) via the Internet network (20),
    a major router (31) for searching a fast and effective path to receive said processed information,
    a mobile phone broadcasting platform (40) consisting of a mobile phone broadcasting server (32) for categorizing and separating the information received from the information providing system (10) via the major router (31) into the voice, multimedia, text and image information, an automatic response system (ARS) (33) for storing the voice information and a wireless Internet broadcasting server (34) for storing the multimedia information,
    said cell broadcasting system (CBS) (35) for storing and transmitting the categorized and separated text and image information,
    an inter-gateway system (IGS) (36) connected to the ARS for voice communication,
    an inter-working function server (IWF) (37) connected to the wireless Internet broadcasting server (34) for data communication, a mobile switch center (MSC) (39) connected to the IGS (36) for data communication, a dedicated packet network (38) connected to the wireless Internet broadcasting server (34) for data communication, a wireless network (50) for receiving information from the CBS (35) and said mobile phone broadcasting platform (40), and a plurality of mobile phone terminals (60) for selectively and simultaneously receiving said text and image information or voice and multimedia information.

2. A system of providing a mobile phone broadcasting service according to claim 1, wherein said information providing system (10) further comprises: a dedicated content server (11) for processing a variety of updated information in forms of voice, multimedia, text and image, a web server (12) for constructing a web-based service environment over the Internet network, and a minor router (13) for searching a fast and effective path to transmit said processed information.

3. A system of providing a mobile phone broadcasting service according to claim 1, wherein said voice, multimedia, text or image information stored in the mobile phone broadcasting system (30) are selectively and automatically provided upon request by the mobile phone terminals (60).

4. A method of providing a mobile phone broadcasting service utilizing a cell broadcasting system (CBS) comprising:

processing information in forms of voice, multimedia, text and image by an information providing system, transmitting said processed information to a mobile phone broadcasting system through an Internet network, categorizing and separating the information received from the information providing system into the voice, multimedia, text and image information, storing the categorized and separated voice information in an automatic response system (ARS), storing the categorized and separated multimedia information in a wireless Internet broadcasting server, storing the categorized and separated text and image information in the CBS, simultaneously transmitting the text and image information stored in the CBS to a plurality of mobile phone terminals in real time through a wireless network, transmitting the text and image information along with a phone number being able to connect to the ARS, and/or a URL being able to connect to the wireless Internet broadcasting server for serving the voice information or multimedia information according to a request by individual mobile phone terminal, and transmitting the voice information or multimedia information to the individual mobile phone terminal when the individual mobile phone terminal requests by connecting the phone number or the URL.

\* \* \* \* \*